Figure 1:
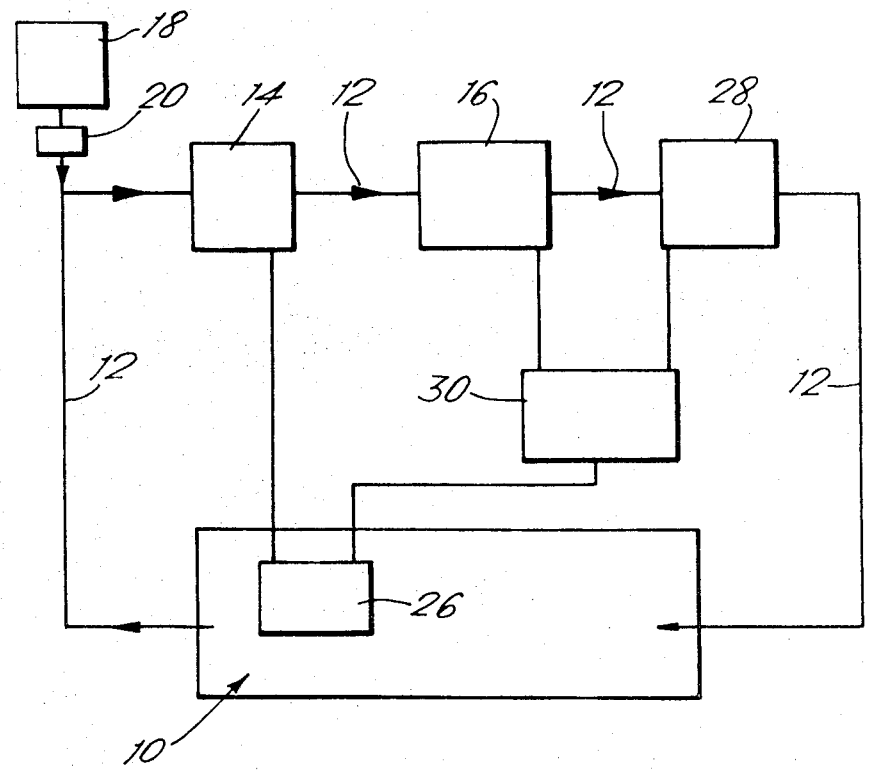

United States Patent

[11] 3,594,546

[72] Inventors George Horn Smillie;
Frank Johnstone, both of Glasgow, Scotland
[21] Appl. No. 856,587
[22] Filed Sept. 10, 1969
[45] Patented July 20, 1971
[73] Assignee Tronapplics Limited
East Kilbridge, Scotland
[32] Priority Sept. 13, 1968
[33] Great Britain
[31] 43,742/68

[54] AIR TEMPERATURE CONTROL APPARATUS
18 Claims, 4 Drawing Figs.
[52] U.S. Cl............................................. 219/501, 236/37
[51] Int. Cl............................................. H05b 1/02
[50] Field of Search.................................... 219/486, 494, 501; 236/37

[56] References Cited
UNITED STATES PATENTS
3,046,380 7/1962 Carlson........................ 219/486
3,165,625 1/1965 Potter.......................... 219/486
3,428,784 2/1969 Pinckaers...................... 219/486
3,450,862 6/1969 Kralovec....................... 219/486

Primary Examiner—Volodymyr Y. Mayewsky
Assistant Examiner—F. E. Bell
Attorney—Mawhinney and Mawhinney ABSTRACT: Apparatus to regulate the temperature of the air in a room comprises a fan to circulate a portion of the air through a heater and to thereafter return the portion of air to the space, a first temperature sensor to sense the temperature of the air in the space, a second temperature sensor to sense the temperature of the said portion of the air before it is returned to the space and control means to control the heater in response to the first and second temperature sensors. The control means employs transistorized voltage-sensitive switching, and thyristors in series with the heater elements.

AIR TEMPERATURE CONTROL APPARATUS

This invention relates to apparatus adapted to regulate the temperature of air in a space such as for example a room.

Although not so restricted, the invention provides in one aspect apparatus adapted to regulate the temperature of the air in a space comprising ducting including an electrical heater, circulating means to circulate a portion of the air in the space through said ducting and to thereafter return the portion of air to the space, temperature-sensing means to sense the temperature of the air, and control means responsive to said temperature-sensing means to control the electrical heater, the control means comprising means to derive from an electrical supply voltage a derived voltage having a cyclic voltage waveform consisting of alternately occurring peaks of relatively large amplitude and troughs of relatively small amplitude, and means to apply said derived voltage to the heater.

The apparatus may be adapted to operate from a source of AC electrical power, the said means to derive and apply the said derived voltage to the heater comprise means to connect the elements to the source during half cycles of the source waveform of one polarity and to disconnect the element from the source during half cycles of the source waveform of opposite polarity, the said means for connecting and disconnecting effecting said connection and disconnection while the instantaneous power about to be drawn or being drawn from the source by the element is small compared to the mean power drawn by the element while connected to the source.

The temperature-sensing means may comprise, a first temperature sensor adapted to sense the temperature of the air in the space, and a second temperature sensor adapted to sense the temperature of the said portion of the air before it is returned to the space preferably after it has passed through the electrical heater.

The circulating means may be arranged to be controlled in response to the first temperature sensor.

There may be means adapted to add air from outside the space to the said portion of air before it passes through the electrical heater.

The temperature-sensing means may comprise a thermistor, a switching transistor being arranged to control the means for connecting and disconnecting, the thermistor forming part of a biassing circuit for the transistor, a potentiometer also forming part of the biassing circuit, for adjusting the temperature at which in operation the switching transistor changes state.

The control means may comprise a unilaterally conductive means adapted to derive said derived voltage from parts of the cycles of an alternating voltage supply, said part cycles all being of one polarity.

The heating means may comprise first and second heating elements or banks of elements in parallel, means to apply the first-mentioned derived voltage to the first element or banks of elements, the control means also comprising a second unilaterally conductive means adapted to derive a further derived voltage from further like parts of the cycles of the supply voltage, the further part cycles all being of opposite polarity to the first-mentioned part cycles, and means to apply the further derived voltage to the second element or bank of elements.

The control means may comprise a logic circuit arranged to control the second unilaterally conductive means so that a further derived voltage is only derived from a given part cycle of opposite polarity when a first-mentioned derived voltage was derived from the immediately preceding said part cycle of one polarity.

The logic circuit may comprise a capacitor arranged to be charged by the derived voltage derived from said immediately preceding part cycle, and arranged to discharge during said given part cycle of opposite polarity to thereby provide a control signal to the second unilaterally conductive means to render it conductive.

The first-mentioned unilaterally conductive means may comprise a thyristor, voltage-sensitive switching being adapted to sense a voltage dependent on the temperature sensed by a said temperature sensor and to render the thyristor conductive by controlling a voltage at its control terminal when said temperature is below a chosen value.

There may be means to connect the control terminal of the thyristor via a capacitor and a bias resistor across the alternating voltage supply such that while said signal is applied to the control terminal, the thyristor is rendered conductive at a time during the alternating voltage cycle in which the alternating voltage has a small increasing value and is rendered nonconductive at a time during the said cycle in which the alternating voltage has reverse biased the thyristor, whereby radio interference and/or harmonic distortion in the alternating voltage supply is reduced.

The control means may comprise a reed relay, the state of which is governed by the voltage-sensitive switching, and means to control said voltage at the control terminal of the thyristor via contacts of the reed relay.

The said electrical heater may constitute a second heater, the said temperature sensor being the second temperature sensor, another electrical heater being controlled in response to the first temperature sensor and constituting a first heater.

The second electrical heater may also be controlled in response to the first temperature sensor.

Preferably, the first temperature sensor may comprise a thermostat, and the second temperature sensor may comprise a thermistor. In operation, the current for the electrical heater may pass through the thermostat.

Figure 3:
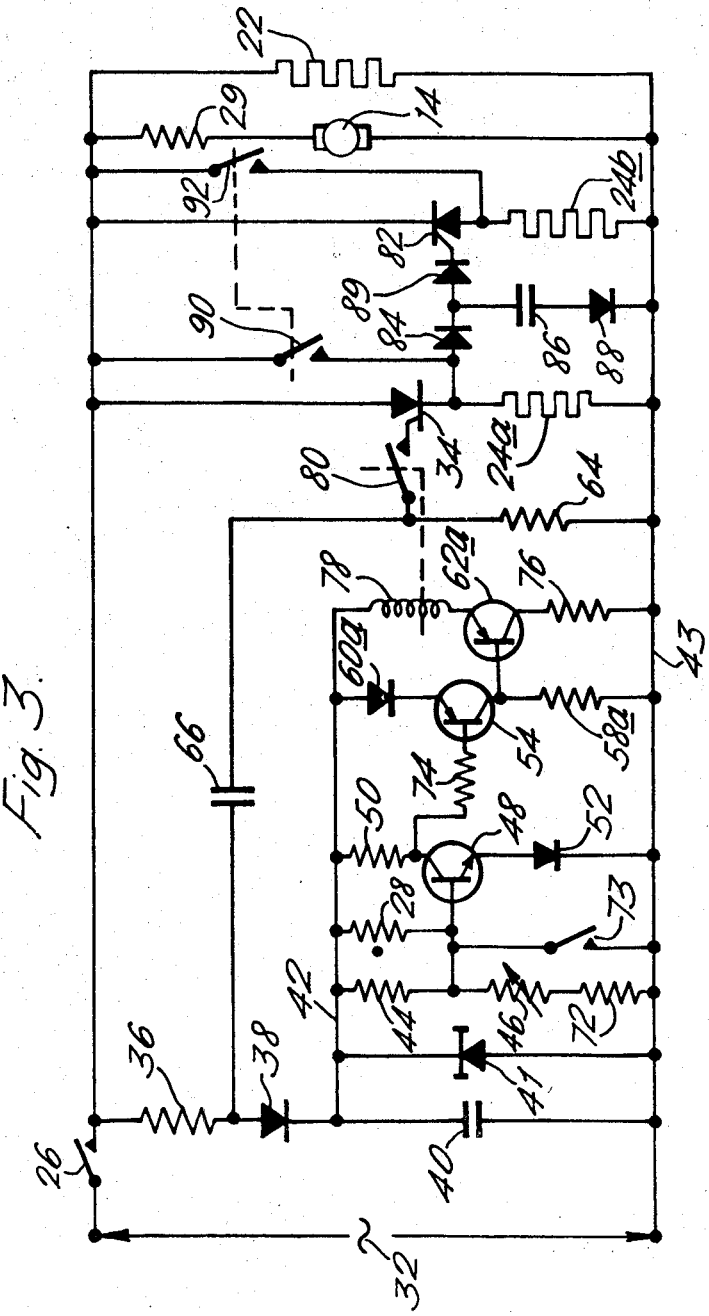
Figure 4:
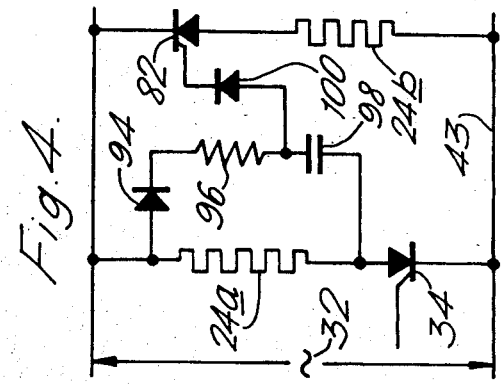
Figure 2:
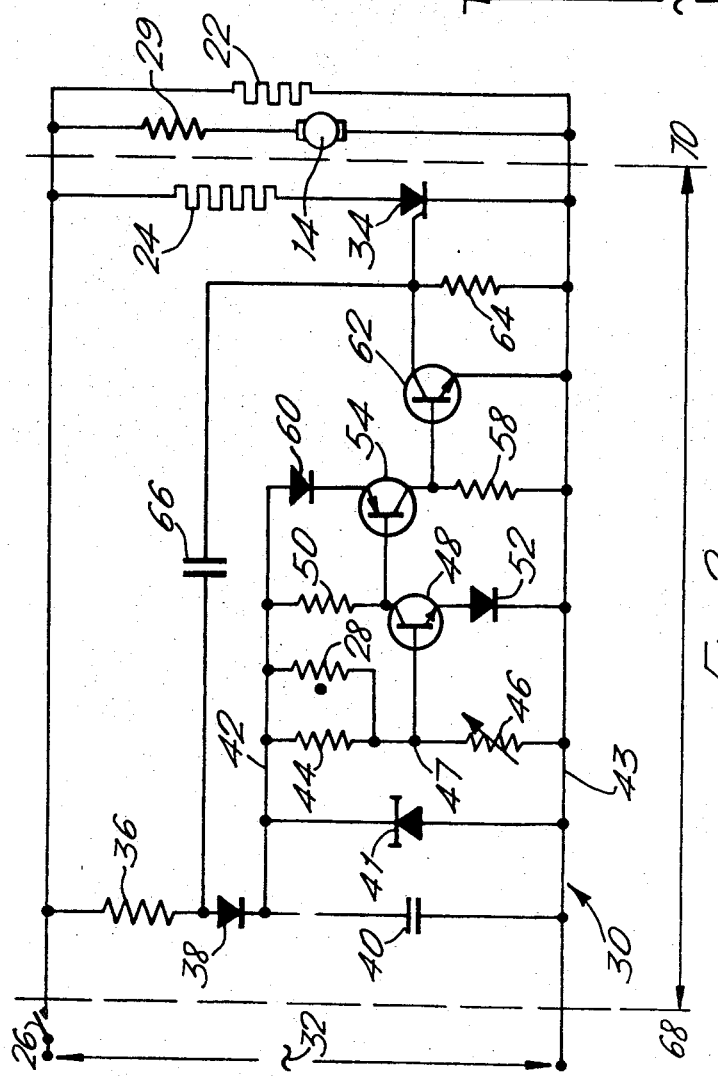

The invention will be described, merely by way of example, with reference to the accompanying drawings, wherein:

FIG. 1 shows apparatus according to the invention,
FIG. 2 shows a control means forming part of the apparatus of FIG. 1,
FIG. 3 shows an alternative control means, and
FIG. 4 shows an alternative form of part of the control means of FIGS. 2 or 3.

Referring to FIG. 1, there is shown apparatus adapted to regulate the temperature of the air in a space 10 such as a room, e.g. to maintain it at a desired value. The apparatus comprises circulating means (a fan unit 14) to circulate a portion of the air in the room 10 through ducting 12 including heat exchange means 16 and thereafter returning it to the room 10.

It will be appreciated that the fan 14 and the heating means 16 may be incorporated in a free-standing unit situated in the room 10. The ducting 12 is then constituted by the casing of the unit defining the air flow passage therethrough.

Fresh air may be added to the apparatus from outside the room 10 via a fresh air vent 18 at a point upstream of the heat exchange means 16. If desired, the incoming fresh air may first be passed through an air conditioning (e.g. filtering, deodorizing and humidifying) unit 20. The heat exchange means 16 comprises first and second electrical heaters 22, 24 which are respectively controlled in response to signals from first and second temperature sensors 26, 28 described hereinafter. The fan 14 may be of conventional type and is provided with a series resistor 29 to adjust its head consistent with a particular operating environment.

The heaters may alternatively be steam or pressure hot-water-heating plant. However, the heaters 22, 24 are preferably electrical heaters. The first heater 22 is located upstream of the second heater 24 and having regard to the following discussion it will be seen that the electrical heaters operate as a "scaled wattage" bank, the heater 24 being excessively warm and thereby having an increased life.

The first temperature sensor 26 comprises a thermostat and is located in the room 10, and controls both the first and second heaters and the fan 14. The temperature sensor 26 may be of the conventional "roomstat" variety and thus, as shown in FIGS. 2 and 4, has the load current for the heaters passing through it. The second temperature sensor 28 comprises a thermistor, and controls the second heater 24.

The second temperature sensor 28 is located in the duct 12 downstream of the heating means 16, to sense the temperature of the air that has passed therethrough, but before it reenters the room 10.

A control means 30 is provided, through which are fed the control signals from the first and second temperature sensors 26, 28 to the heat exchange means 16, to control the rate of heat exchange therein. Since only a portion of the air in the room 10 passes at any one time through the heat exchange means 16, it will be appreciated that to effect a given change in temperature of the air in the closed space a larger change in the temperature of the air passing through the heat exchange means is required. This may facilitate more accurate control of the heat exchange means, since an inaccuracy in the temperature sensed by the second sensor 28 relates to a portion of the air only, and its effect on the temperature of the whole of the air in the room is reduced.

Perhaps more importantly, from an environmental engineering aspect, the control means 30 and the second temperature sensor 28 in this preferred embodiment may be made sufficiently sensitive to reduce the heat output of the heat exchange means 16 is a light is switched on in the room, if a person walks into the room (since the human body emits heat) or if the sun shines through a window. This may result in more economical consumption of power, and the room temperature being maintained more nearly constant.

Although it is preferably that the second temperature sensor 28 is downstream of the heat exchange means 16, this is not essential, since it is possible to predict with sufficient accuracy the temperature of the air leaving the duct 12 provided its temperature somewhere in the ducting is known, the heat input to the heat exchange means is known and the heat transfer characteristics of the heat exchange means are known, Thus the second temperature sensor may be placed upstream of the first heater 22 or between the first and second heaters 22, 24.

Referring now to FIG. 2, there is shown a circuit diagram of the control means 30, together with diagrammatic representations of certain of the features of FIG. 1. These features retain the same reference numerals as in FIG. 1.

The first heater 22 and the fan 14 are connected in parallel across the mains alternating voltage supply 32, the first temperature sensor 26 comprising a switch in the live line of the connection to the mains. Also connected in parallel with the fan 14 and the first heater 22 across the mains 32 is the second heater 24 which is in series with the anode-cathode circuit of a thyristor 34. The first and second heaters 22, 24 are shown as electrical heaters; in cases in which they are not electrical heaters, slave devices such as relays are substituted in the FIG. 2 circuit.

The control means 30 comprises a circuit to provide a stabilized DC voltage, comprising a stepdown resistor 36, a rectifier or diode 38 and a reservoir capacitor 40 connected in series across the mains supply, and a zener diode 41 connected across the capacitor 40 to the neutral line of the mains supply. A stabilized DC voltage is thus provided across positive and negative rails 42, 43 connected to the terminals of the zener diode 41.

The control means 30 incorporates a resistance bridge of which second temperature sensor 28 forms part. The other parts of the resistance bridge are a fixed resistor 44 and a variable resistor 46, the three components 28, 44, 46 having a common junction 47. The resistor 46 is variable in a predetermined manner, e.g. by means of a control knob, so as to enable an operator to choose the temperature sensed by the thermistor 28 at which the second heater 24 is energized, as hereinafter described. A switching transistor 48 has its base connected to the junction 47 between the variable resistor 46, the resistor 44 and the thermistor 28. The collector of the transistor is biased from the positive rail 42 by a resistor 50. The emitter of the transistor 48 is connected to the negative rail 43 via a unilaterally conductive diode 52 arranged so that its low forward impedance allows the transistor 48 to conduct when the potentials supplied to the various terminals thereof are correct. The emitter-to-base bias circuit of the transistor 48 thus comprises the diode 52. Since the diode 52 has a low forward impedance, it follows that when the transistor is conducting, the potential at the emitter is only slightly above the potential of the negative rail 43. The potential required at the base of the transistor 48 to switch it into its conducting state is therefore also only slightly above the potential of the negative rail 43, and this enables the sensitivity of the resistance bridge 28, 44, 46 to be increased, enabling the transistor 48 to be switched on or off as the voltage at the junction 47 passes through a well-defined predetermined value.

The transistor 48, which is a NPN-type transistor, has its collector connected to the base of a PNP transistor 54. This transistor has its collector biased from the negative rail 43 via a resistor 58 and has its emitter biased from the positive rail 42 via a second unilaterally conducting diode 60. The transistors 48 and 54 thus constitute an amplifying switch, the base voltages at which the transistors conduct being very close to their respective emitter voltages.

The base connection of a further switching transistor 62 is connected on the collector of the transistor 54 and thus receives the output of the amplifying switch 48, 54. The emitter of the further switching transistor 62 is connected to the negative rail 43. The collector of the transistor 62 is connected to the control terminal of the thyristor 34, a resistor 64 being connected in parallel with the emitter-collector path of the transistor 62 between the control terminal of the thyristor 34 and the negative rail 43. A capacitor 66, the purpose of which will be apparent hereinafter, is connected from the anode of the rectifier 38 to the control terminal of the thyristor 34.

The control means 30 operates as follows: The resistance of the thermistor 28 varies as a function of the temperature sensed thereby. Variation in the resistance of a thermistor 28 will therefore alter the voltage developed between the junction 47 and the negative rail 43 across the resistor 46, and this temperature dependent voltage is utilized to control the energization or deenergization of the second heater 24. The resistor 46 is calibrated in terms of the temperature sensed by the thermistor 28, and may be adjusted to choose the temperature which when sensed by the thermistor 28 causes the second heater 24 to be turned on or off. It will be appreciated that when the temperature sensed by the thermistor 28 is low, the resistance of the thermistor 28 is high and the temperature-sensitive voltage across the resistor 46 is relatively low. Depending on the setting of the resistor 46, this voltage may be sufficiently low for the transistor 48 to be switched off. This is turn switches off the transistor 54, turning off the transistor 62. A voltage is thereby developed across the resistor 64 between the cathode and control terminals of the thyristor 34, causing the thyristor 34 to conduct and the second heater 24 to be energized.

As the temperature sensed by the thermistor 28 rises, its resistance falls, and the temperature-sensitive voltage across the resistor 46 rises until it passes through a predetermined value (characteristic of the transistor 48) causing the transistor to switch on, switching transistor 54 on and transistor 62 on. The diode 60 limits the current flowing from the positive rail 42 via the transistors 54 and 62 to the negative rail 43, when the transistor 62 is conducting the resistor 64 is short circuited, and the control terminal and the cathode of the thyristor 34 are at substantially the same potential. The thyristor thus ceases to conduct, and the second heater 24 is deenergized.

It will be appreciated that if the temperature sensed by the thermistor 28 now falls, the reverse procedure occurs and the second heater 24 is one again energized. Thus the transistors 43, 54, 62 constitute voltage-sensitive switching which senses the temperature dependent voltage across the resistor 46.

Since the thermistor 28 senses the temperature of the air in the ducting 12 before it reenters the room 10, changes in the temperature of the ambient air drawn in via the vent 18 are quickly sensed and the room is maintained at a much more even temperature than would be the case if the thermostat 26 were the only temperature-sensing means employed. Similarly, if for example a window were opened in the room, then the drop in temperature would quickly be sensed by the thermistor 28, and the appropriate corrective action taken.

The thyristor 34 need not be provided if the second heater 24 is a nonelectrical heater, then a slave device such as a relay being provided instead.

However, when the second heater 24 is an electrical heater (i.e. containing electrical elements which are heated by ohmic heating on passing a current therethrough), we have found that more efficient dissipation of heat may be obtainable when a unilaterally conductive means such as a thyristor 34 is employed.

The thyristor 34, being in series with the second heater 24 across the AC mains, provides across the second heater a derived voltage derived from only a given part of each cycle of the AC main. These part cycles all have one polarity and approximate to half cycles.

Thus the control means 30, including the thyristor 34, are adapted to derive from an electrical supply voltage a derived voltage having a cyclic voltage waveform consisting of alternately occurring peaks of relatively large amplitude and troughs of relatively small amplitude, and means to apply said derived voltage to the heater.

Since the thyristor 34 is connected via the second heater 24 across the alternating voltage mains and switches the heaters on and off repeatedly. This would normally give rise to radio interference and would also feed back harmonic distortion into the mains supply. In order to minimize or at least reduce this interference and/or distortion, the aforementioned capacitor 66 is provided, its value and the value of the resistor 64 being chosen such that the thyristor 34 switches to its conducting state at a time during the alternating voltage cycle in which the voltage has a small positive increasing in value, and switches to its nonconductive state at a time during the alternating voltage cycle in which the voltage has reversed biased the thyristor anode-cathode path. The switching on and off of the second heater 24 thus occurs when the instantaneous power it is drawing or is about to draw from the mains is at or near zero, and thus small compared to the mean power that it draws when connected. The second heater of course is an almost nonreactive load. Furthermore, it will be noted that since in this embodiment the thermostat 26 controls the power supply to both the first 22 and second 24 heaters, the second heater 24 will only be switched on and off by the thyristor 34 when the first heater 22 is energized. Consequently, as far as the mains supply is concerned, the switching is merely between two finite levels of power consumption, and not between a finite power consumption and zero consumption. This further reduces radio interference and harmonic distortion.

FIG. 3 shows an alternative control means. Parts already described with reference to FIG. 2 carry the same reference numerals and will not be described again. Parts having suffixed reference numerals are parts described with reference to FIG. 2, but with modification.

Referring to FIG. 3, and additional resistor 72 is provided in series with the variable resistor 46 to enable the temperature range within which the thermistor 28 may be set to energize the heater 24 to be adjusted according to the climate in which the apparatus is intended to be used. A switch 73 is provided in parallel with the components 73, 46 for a reason discussed hereafter.

A resistor 74 is provided in the line to the base of the transistor 54 to control the base current. This enables the diode 60a to be reversed, or alternatively a relatively low resistor (of order a few hundred ohms) may be substituted. The value of the resistor 58a is adjusted according to the value of the resistor 74, to maintain the correct base/collector bias.

The transistor 62a in this embodiment is a PNP type, not a NPN type as in FIG. 2. Thus an appropriate biasing resistor 76 is provided on the collector. Between the emitter of the transistor 62a and the positive rail 42 is the operating coil 78 of a reed relay. The contacts 80 of the reed relay when closed connect the control terminal of the thyristor 34 to the junction of the resistor 64 and the capacitor 66. It will be noted that there is no connection between the emitter of the transistor 62a and the control terminal of the thyristor 34.

The biasing of the FIG. 3 circuit in such that when the temperature sensed by the thermistor 28 is below the predetermined value the transistor, the transistors 48 and 54 are off and the transistor 62a is on, closing the reed relay contacts 80. Thus the thyristor 34 conducts and the second heater 24 is energized. When the predetermined temperature is reached, the transistors 48, 54 turn on and the transistor 62a turns off, deenergizing the heater 24. The normally open reed contacts 80 prevent DC leakage from the transistor 62a to the mains supply, and also guards against radiointerference from the switching transistors 48, 54 and 62a.

In the FIG. 3 embodiment, the second heater comprises two elements or banks of elements 24a, 24b in parallel. One bank of elements 24a is in series with the thyristor 34, although on the opposite side thereof compared to FIG. 2, and the second bank of elements 24b is in series with a second unilaterally conductive means comprising a thyristor 82, oppositely arranged relative to the thyristor 34. The cathode of the thyristor 34 is connected via a logic circuit comprising a diode 84, a capacitor 86 and another diode 88 to the neutral line 43. The control terminal of the thyristor 82 is connected via a diode 89 to the junction between the diode 84 and the capacitor 86.

In operation, assuming an appropriate voltage at its control terminal the thyristor 82 conducts during a further like part of each cycle of the AC mains supply voltage, these further like part cycles being of opposite polarity to the part cycles of one polarity during which the first thyristor 34 conducts. Thus, a further derived voltage is applied to the second bank of elements 24b. The part cycles of opposite polarity approximate to half cycles, and the two banks of elements 24a and 24b thus operate effectively as two heaters roughly 180° out of phase with each other, so that the heater 24 as a whole offers a balanced load to the mains supply.

Since the part cycles of opposite polarity approximate to half cycles and are 180° out of phase with the part cycles of one polarity, it follows that the elements 24b are also connected to or disconnected from the mains when the instantaneous power drawn thereby is small compared to the mean power that they draw when connected.

In order to maintain the balanced nature of the load, the logic circuit ensures that the thyristor 82 conducts during a given part cycle of opposite polarity to provide a further derived voltage across the elements 24b only if the thyristor 34 conducted during the immediately preceding part cycle of said one polarity, to provide a derived voltage across the elements 24a.

Thus, when the thyristor 34 conducts during a part cycle, the capacitor 86 is charged. During the next following part cycle of opposite polarity the capacitor 86 discharges via the control terminal of the thyristor 82, thus turning it on. If the reed relay contacts 80 then open, the thyristor 34 does not conduct during the next part cycle of one polarity and the capacitor 86 is not charged. Thus no control signal voltage is available for the thyristor 82, and it does not conduct either. The diode 89 assures that no control current is present at the thyristor 82 when its cathode is positive to its anode (e.g. during the part cycles during which the thyristor 34 conducts).

Although we consider it preferable to employ semiconductive means such as the thyristors 34, 82 in series with the second heater elements 24a, 24b it is sometimes desirable to provide maximum heat output without regard for economy. Therefore manual ganged switches 73, 90, 92 are provided, the switch 73 being arranged to short circuit the resistors 46, 72 to override the predetermined controlling temperature of the thermistor 28, the switches 90, 92 bypassing the thyristors 34, 82 to apply full-wave mains voltage to the second heater 24a, 24b. Alternatively if desired the switches 73, 90, 92 may be separately operable switches.

FIG. 4 shows an alternative form of the logic circuit. Parts common to FIGS. 3 and 4 have the same reference numerals, and will not be described again.

In FIG. 4 it will be noted that the positions of the first bank of elements 24a and the thyristor 34 are reversed. The logic circuit comprises, in parallel with the first bank of elements 24a a series circuit comprising a diode 94, a ballast resistor 96 and a capacitor 98. The junction of the resistor 96 and the capacitor 98 is connected to the control terminal of the second thyristor 82 via a diode 100.

The operation of this logic circuit is similar to that of the FIG. 3 logic circuit: when the thyristor 34 conducts during a part cycle it charges the capacitor 98 and during the next part cycle of opposite polarity the capacitor 98 discharges via the control terminal of the thyristor 82, providing a control current and enabling it to conduct. The diode 100 ensures that no control current is present at the thyristor 82 when its cathode is positive to its anode (e.g. during the part cycles during which the thyristor 34 conducts).

Since the relative position of the first bank of elements 24a and the thyristor 34 is the same as in FIG. 2, a heater comprising two elements or banks of elements arranged as in FIG. 4 can be controlled by the circuitry of FIG. 2.

We claim:

1. Apparatus adapted to regulate the temperature of the air in a space comprising ducting including an electrical heater, circulating means to circulate a portion of the air in the space through said ducting and to thereafter return the portion of air to the space, temperature-sensing means to sense the temperature of the air, and control means responsive to said temperature-sensing means to control the electrical heater, the control means comprising means to derive from an electrical supply voltage a derived voltage having a cyclic waveform consisting of alternately occuring peaks of relatively large amplitude and troughs of relatively small amplitude, and means to apply said derived voltage to the heater.

2. Apparatus as claimed in claim 1 wherein the apparatus is adapted to operate from a source of AC electrical power, the said means to derive and apply the said derived voltage to the heater comprise means to connect the element to the source during half cycles of the source waveform of one polarity and to disconnect the element from the source during half cycles of the source waveform of opposite polarity, the said means for connecting and disconnecting effecting said connection and disconnection while the instantaneous power about to be drawn or being drawn from the source by the element is small compared to the mean power drawn by the element while connected to the source.

3. Apparatus adapted to regulate the temperature of the air in a space comprising ducting including an electrical heater, circulating means to circulate a portion of the air in the space through said ducting and to thereafter return the portion of air to the space, a first temperature sensor to sense the temperature of the air in the space, a second temperature sensor to sense the temperature of the said portion of the air before it is returned to the space and control means responsive to said temperature sensors to control the electrical heater, the control means comprising means to derive from an electrical supply voltage a derived voltage having a cycle voltage waveform consisting of alternately occurring peaks of relatively large amplitude and troughs of relatively small amplitude, and means to apply said derived voltage to the heater.

4. Apparatus as claimed in claim 3 wherein the first temperature sensor is thermistor, thermostat, through which in operation the current for the electrical heater passes.

5. Apparatus as claimed in claim 2 wherein the temperature-sensing means comprises a thermistor, a switching transistor being arranged to control the means for connecting and disconnecting, the thermistor, forming part of a biassing circuit for the thermistor, a potentiometer also forming part of the biasing circuit, for adjusting the temperature at which in operation the switching transistor changes state.

6. Apparatus as claimed in claim 3 wherein the second temperature sensor is positioned to sense the temperature of the portion of air after it has passed through the electrical heater.

7. Apparatus as claimed in claim 3 comprising means to control the circulating means in response to the first temperature sensor.

8. Apparatus as claimed in claim 3 comprising means to add air from outside the space to the said portion of air before it passes through the electrical heater.

9. Apparatus as claimed in claim 1 wherein the control means comprises a unilaterally conductive means adapted to derive said derived voltage from parts of the cycles of an alternating voltage supply, said part cycles all being of one polarity.

10. Apparatus as claimed in claim 9 wherein the electrical heater comprises first and second heating elements or banks of elements in parallel, means to apply the first-mentioned derived voltage to the first element or bank of elements, the control means also comprising a second unilaterally conductive means adapted to derive a further derived voltage from further like parts of the cycles of the supply voltage, the further part cycles all being of opposite polarity to the first-mentioned part cycles, and means to apply the further derived voltage to the second element or bank of elements.

11. Apparatus as claimed in claim 10 wherein the control means comprises a logic circuit to control the second unilaterally conductive means whereby a further derived voltage is only derived from a given part cycle of opposite polarity when a first-mentioned derived voltage was derived from the immediately preceding said part cycle of one polarity.

12. Apparatus as claimed in claim 11 wherein the logic circuit comprises a capacitor, means to charge said capacitor by the derived voltage derived from said immediately preceding part cycle, and means to discharge said capacitor during said given part cycle of opposite polarity, thereby providing a control signal to the second unilaterally conductive means to render it conductive.

13. Apparatus as claimed in claim 9 wherein the first-mentioned unilaterally conductive means comprises a thyristor, means to provide a voltage dependent on the temperature sensed by a said temperature sensor and voltage-sensitive switching to sense said temperature-dependent voltage and to render the thyristor conductive by controlling a voltage at its control terminal when said temperature is below a chosen value.

14. Apparatus as claimed in claim 13 comprising means to connect the control terminal of the thyristor via a capacitor and a bias resistor across the alternating voltage supply, the thyristor being conductive while said signal is applied to the control terminal at a time during the alternating voltage cycle in which the alternating voltage has a small increasing value and being nonconductive at a time during the said cycle in which the alternating voltage has reverse biased the thyristor, reducing radio interference and/or harmonic distortion in the alternating voltage supply.

15. Apparatus as claimed in claim 13 wherein the control means comprises a read relay, the voltage-sensitive switching governing the state of the reed relay, and means to control said voltage at the control terminal of the thyristor via contacts of the reed relay.

16. Apparatus as claimed in claim 13 wherein the said electrical heater constitutes a second heater, the said temperature sensor being the second temperature sensor, another electrical heater constituting the first heater, there being means to control the first heater in response to the first temperature sensor.

17. Apparatus as claimed in claim 16 comprising means to control the second electrical heater also in response to the first temperatures sensor.

18. Apparatus as claimed in claim 3 wherein the first temperature sensor comprises a thermostat, and the second temperature sensor comprises a thermistor.